United States Patent [19]

Laing

[11] Patent Number: 4,729,512

[45] Date of Patent: Mar. 8, 1988

[54] ROCKET NOZZLES IN LAYERED CONSTRUCTION

[76] Inventor: Johannes L. N. Laing, 1253 La Jolla Rancho Rd., La Jolla, Calif. 92037

[21] Appl. No.: 800,547

[22] Filed: Nov. 21, 1985

[51] Int. Cl.$^4$ .............................................. B64D 33/04
[52] U.S. Cl. .................................. 239/265.11; 428/408
[58] Field of Search ............... 239/265.11, 265.13, 239/265.15, 265.17, 265.19, 265.23, 265.25, 265.27, 265.31, 265.33, 591, 600, DIG. 19; 138/140, 141; 428/408, 457, 913; 60/253, 909

[56] References Cited

U.S. PATENT DOCUMENTS

| | | | |
|---|---|---|---|
| 2,658,332 | 11/1957 | Nicholson | 60/909 X |
| 2,706,382 | 4/1955 | Logan et al. | 60/909 X |
| 3,133,411 | 5/1964 | McCorkle | 239/591 X |
| 3,156,091 | 10/1964 | Kraus | 239/265.11 |
| 3,224,193 | 12/1965 | Loprote et al. | 60/909 X |
| 3,313,488 | 4/1967 | Lovingham | 239/265.11 |
| 3,639,159 | 2/1972 | Rose et al. | 239/265.15 |
| 3,723,214 | 3/1973 | Meraz | 239/265.11 |
| 3,900,675 | 8/1975 | Olcott | 239/265.15 |
| 3,980,105 | 9/1976 | Myskowski | 239/265.11 |
| 4,067,956 | 1/1978 | Franklin et al. | 428/408 X |
| 4,327,868 | 5/1982 | Burkes, Jr. | 239/265.15 |
| 4,502,983 | 3/1985 | Omori et al. | 428/408 X |
| 4,621,017 | 11/1986 | Chandler et al. | 428/408 X |

*Primary Examiner*—Andres Kashnikow
*Assistant Examiner*—Kevin Patrick Weldon

[57] ABSTRACT

An improved rocket nozzle liner for solid fuel rockets which is constructed from an inner liner of silicon carbide, a layer of highly anisotropic graphite and an outer shell of heat resistant material. The layer of anisotropic graphite permits thermal expansion of the silicon carbide, thus preventing the build up of thermal stresses and resulting fractures.

3 Claims, 1 Drawing Figure

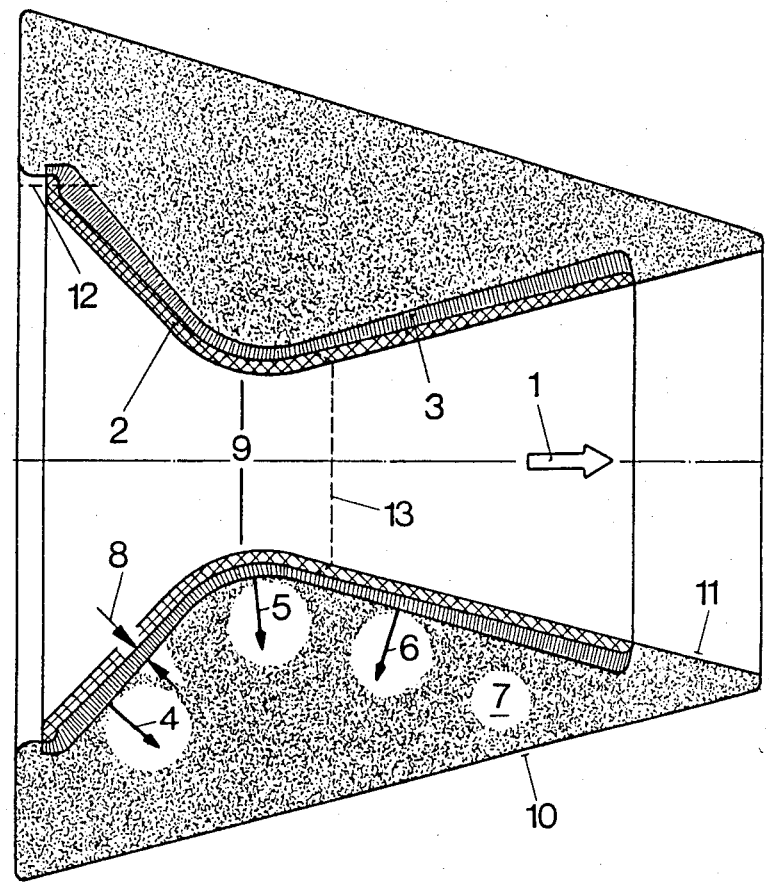

ROCKET NOZZLES IN LAYERED CONSTRUCTION

BACKGROUND OF THE INVENTION

The invention relates to nozzles for solid fuel rockets, especially for single mission rockets. The nozzles of solid fuel nozzles must satisfy the following demands:

to obtain optimum efficiency it is necessary to operate at the highest temperature possible, within the limits of the material properties, the temperature gradient is extremely steep because the maximum temperature is reached only milliseconds after ignition, mechanically they must be able to withstand the pressure forces inside the rocket and the thrust generated by the gas jet, uncombusted metal of the fuel causes high energy knocks on the surface, suspended solid particles in the gas mixture cause mechanical abrasion in the throat region, free oxygen or other aggressive gases cause chemical corrosion.

Currently, rocket nozzles are made from graphite, tungsten, or metal carbides. It is known that silicon carbide shows extremely low rates of ablation. On the other hand, silicon carbide has severe tendency to suffer from cracks caused by the thermal expansion of the inner layer realtive to the outer layers. This excludes silicon carbide for rocket applications.

BRIEF DESCRIPTION OF THE DRAWING

The drawing illustrates a cross-sectional view of the nozzle rocket liner.

SUMMARY OF THE INVENTION

The invention takes advantage of the high temperature properties of silicon carbide but eliminates at the same time the danger of cracking. The invention consists of a design whereby only the inner liner is made from silicon carbide with a high heat conductivity. The wall is so thin that no internal stress forces, the cause of fissures or cracks, can be built up. Then, the mechanical forces are absorbed by an outer shell with a thick wall made from sufficiently heat resistant material, e.g. phenolic graphite. Between the thin wall liner and this outer shell, there is a layer made of highly anisotropic graphite. The crystals of this graphite are grown in a direction perpendicular to the corresponding adjacent liner surface.

The thermal expansion of the liner causes considerable compressive stresses in the radial direction. According to the invention, the resulting increase in dimension will be absorbed by the intermediate jacket consisting of anisotropic material. The vector of the crystalline structure of this material having the lowest ultimate compressive strength is normal to the outer surface of the liner. The liner is able to compress the intermediate jacket in the radial direction. The ultimate compression strength of said material in the remaining two vectorial directions is about one order of magnitude higher. This enables transfer of the mechanical forces from the liner to the shell. The axial length of the liner should be as short as possible. The liner of nozzles above a certain size can be made by joining together two or more rings.

DETAILED DESCRIPTION OF THE PREFERRED EMBODIMENT

The gas stream, symbolised by arrow (1), is guided by the liner (2) made from silicon carbide. A preferred process to manufacture said liner is the reaction sintering process. After siliconization, the liner is heated under vacuum to vaporize the free silicon that by siliconisation filled the pores. The next step is the production of the jacket (3) through pyrolytic growth of graphite crystals. The wall thickness of this graphite jacket can be reduced up to 15% under high pressure. This occurs if forces act in the direction of the vector of the smallest ultimate compression strength. The increase of the diameter of the inside liner by thermal expansion depends on its diameter and maximum operating temperature. The minimum wall thickness of the jacket must be made proportional to the expected radial expansion of the liner. Therefore, the thickness of the jacket is greater in the region of the largest diameter (12), facing the inside of the rocket, than in the area of the throat, having about the same temperature, and also larger than around the end of the diffuser, which has a considerably lower temperature.

The inner shape of the shell (7) follows that of the jacket (3). The outside (10) of the shell (7) is conically shaped. Part of the shell's inside, situated in a region where the gas temperature has already considerably decreased, acts as part of the diffuser (11). The dotted line (13) indicates the plane where two axial rings (2a and 3) forming the liner are held together by the shell. For small nozzles, the liner (2) consists of one part only.

I claim:

1. A process to produce a rocket nozzle, whose inside surface guides a gas stream, and is formed by a liner made from a carbide material according to the following steps:

A—a powder, comprising silicon carbide crystals, carbon and a binder material is isostatically pressed into a thin walled body of rotation with the shape of a liner (2) having a converging portion, a neck portion and a diverging portion, B—said body of rotation is converted to silicon carbide by siliconization in a reaction-sintering process, forming said liner (2), C—a layer of highly anisotropic graphite, the surface of which is normal to the vectorial direction of the lowest ultimate compression strength of said graphite, forms a jacket (3) around the outer surface of the liner (2) permitting thermal expansion of the liner (2) during rocket operation, said layer being applied sufficiently thick in order to be able to absorb said thermal expansion, D—a thick layer of a heat resistant material such as phenolic graphite is arranged around the outer surface of the jacket (3) forming a third layer, E—the thin walled liner (2), with the jacket (3) and the third layer is heated in an inert atmosphere until the thick layer hardens and forms a shell (7).

2. A process to produce a rocket nozzle, whose inside surface guides a gas stream, and is formed by a liner made from a carbide material according to the following steps:

A—a powder, comprising silicon carbide crystals, carbon and a binder material is isostatically pressed into a thin walled body of rotation with the shape of a liner (2) having a converging portion, a neck portion and a diverging portion, B—said body of rotation is converted to silicon carbide by siliconization in a reaction-sintering process, forming said liner (2), C—the liner (2) is kept under vacuum at a temperature above 1400 C to vaporize the majority of free silicon, D—a layer of highly anisotropic graphite, the surface of which is normal to the vectorial direction of the lowest ultimate compression strength of said graphite, forms a jacket (3) around the outer surface of the liner (2) permitting thermal expansion of the liner (2) during rocket operation, said layer being applied sufficiently thick in order to be able to absorb said thermal expansion, E—a thick layer of a heat resistant material such as phenolic graphite is arranged around the outer surface of the jacket (3) forming a third layer, F—the thin walled liner (2), with the jacket (3) and the third layer is heated in an inert atmosphere until the thick layer hardens and forms a shell (7).

3. A process to produce a rocket nozzle, whose inside surface guides a gas stream, and is formed by a liner made from a carbide material according to the following steps:

A—a powder, comprising silicon carbide crystals, carbon and a binder material is isostatically pressed into a thin walled body of rotation with the shape of a liner (2) having a converging portion, a neck portion and a diverging portion, B—said body of rotation is converted to silicon carbide by siliconization in a reaction-sintering process, forming said liner (2), C—the liner (2) is kept under vacuum at a temperature above 1400 C to vaporize the majority of free silicon, D—the outer surface of the liner (2) is exposed to a pyrolysis treatment to produce crystal growth in a direction that results in anisotropic distribution of the lowest ultimate compression strength, the vectorial direction of the lowest ultimate compression strength being normal to the outside surface of the liner, this treatment being applied until the thickness of the deposition, which forms a jacket (3) consisting of anisotropic crystals, permits thermal expansion of the liner (2) because of the low ultimate compression strength of the jacket (3) in a direction normal to the outside surface of the liner (2), permitting a sufficient reduction of the thickness of the jacket (3) under the pressure of the forces of the thermal expansion of the liner (2) during operation of the rocket, E—a thick layer of a heat resistant material such as phenolic graphite is arranged around the outer surface of the jacket (3) forming a third layer, F—the thin walled liner (2), with the jacket (3) and the third layer are heated in an inert atmosphere until the thick layer hardens and forms a shell (7).

* * * * *